United States Patent
Forero et al.

(10) Patent No.: US 8,942,431 B2
(45) Date of Patent: Jan. 27, 2015

(54) BIOMETRICS BASED METHODS AND SYSTEMS FOR USER AUTHENTICATION

(75) Inventors: James Forero, Paramus, NJ (US); Dmitry Alexandrovich Dziuba, Kyiv (UA)

(73) Assignee: Neurologix Security Group Inc

(*) Notice: Subject to any disclaimer, the term of this patent is extended or adjusted under 35 U.S.C. 154(b) by 347 days.

(21) Appl. No.: 13/531,550

(22) Filed: Jun. 24, 2012

(65) Prior Publication Data

US 2013/0343616 A1    Dec. 26, 2013

(51) Int. Cl.
*G06K 9/00* (2006.01)

(52) U.S. Cl.
USPC ......................................................... 382/115

(58) Field of Classification Search
None
See application file for complete search history.

(56) References Cited

U.S. PATENT DOCUMENTS

| | | | |
|---|---|---|---|
| 6,151,593 A * | 11/2000 | Cho et al. | 706/16 |
| 6,961,452 B2 * | 11/2005 | Fujii | 382/125 |
| 7,003,670 B2 | 2/2006 | Heaven et al. | |
| 7,305,559 B2 * | 12/2007 | Schreiber et al. | 713/182 |
| 7,580,551 B1 | 8/2009 | Srihari et al. | |
| 7,630,521 B2 | 12/2009 | Kim et al. | |
| 7,706,574 B1 * | 4/2010 | Ross | 382/115 |
| 7,778,449 B2 * | 8/2010 | Shinzaki | 382/124 |
| 8,078,884 B2 * | 12/2011 | Ramakrishnan et al. | 713/186 |
| 8,285,658 B1 * | 10/2012 | Kellas-Dicks et al. | 706/20 |
| 8,489,635 B1 * | 7/2013 | Phoha et al. | 707/781 |
| 8,768,049 B2 * | 7/2014 | Wang et al. | 382/159 |
| 2005/0008148 A1 * | 1/2005 | Jacobson | 380/26 |
| 2006/0280339 A1 * | 12/2006 | Cho | 382/115 |
| 2007/0236330 A1 * | 10/2007 | Cho et al. | 340/5.54 |
| 2008/0120698 A1 | 5/2008 | Ramia | |
| 2009/0217361 A1 | 8/2009 | Crandell | |
| 2011/0083016 A1 | 4/2011 | Kesanupalli et al. | |

* cited by examiner

*Primary Examiner* — Vikkram Bali
(74) *Attorney, Agent, or Firm* — Ilya Svetlov

(57) ABSTRACT

Disclosed are computer-implemented methods and systems for authentication of users through capturing and analyzing biometrics data such as keystroke dynamics. Once the keystroke dynamics is acquired, a corresponding feature vector related is calculated by calculating multiple sub-feature values using various algorithms such as normalization, relations between keystroke dynamics events, relations of sums of various sub-feature values, and so forth. The feature vector is then selectively compared to a group of reference feature vectors associated with the user. If it is determined that the newly obtained feature vector is similar to the selected group reference feature vectors, the user is authenticated. The process of determining similarity involves decomposition of feature vectors and reference feature vectors onto multiple sub-vectors and calculation similarity therebetween.

18 Claims, 6 Drawing Sheets

BIOMETRICS BASED METHODS AND SYSTEMS FOR USER AUTHENTICATION

TECHNICAL FIELD

The present disclosure relates generally to methods and systems for user authentication, and more particularly to methods and systems for authentication of users by acquiring and processing user biometrics such as keystroke dynamics.

DESCRIPTION OF RELATED ART

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

Biometrics refers to identification of humans that rely on measurable physiological and behavioral characteristics that can be verified. Biometrics systems play an important role in the future of security, access control technology, personal verification, individual identification, and comparison of individuals. Traditionally, the biometrics technology is based on obtaining and processing of fingerprints, voice data, face images, handprints, iris images, retina images, signature images, brainwave data, keystroke dynamics data, and so forth. Depending on the context, a biometric system can be either a verification (authentication) system or an identification system. Verification technique involves confirming or denying a person's claimed identity. Identification technique is focused on establishing a person's identity. Biometrics can be used to prevent unauthorized access to personal data, software, websites, Automated Teller Machines (ATMs), cellular phones, smart cards, computers, communications networks, and so forth.

Today, the authentication systems may utilize artificial neural networks to perform user authentication or identification. The artificial neural networks refer to a broad range of data processing schemes and generally include various interconnected artificial neurons (programming constructs that mimic the properties of biological neurons). Use of the artificial neural networks may usually show good results in authentication, especially when applied to noisy or incomplete data to authenticate or identify users. However, today's authentication systems do not provide accurate identification. According to some researchers, for many today's biometrics-based authentication systems, False Reject Rate (FRR), i.e. a measure of the likelihood that the biometric system will incorrectly reject an access attempt by an authorized user, and False Accept Rate (FAR), i.e. a measure of the likelihood that the biometric security system will incorrectly accept an access attempt by an unauthorized user, may easily run up to 20% or even more depending on used biometrics. Accordingly, there is still a need to improve biometrics based authentication systems, and to provide more accurate authentication and identification of users.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present teachings refer to computer-implemented methods and systems for authentication of users through capturing and analyzing keystroke dynamics. More specifically, the present teachings involve acquiring behavioral biometrics such as keystroke dynamics by prompting a user to make an alphanumeric input, for example, with the use of a keyboard or touchscreen. The user may be prompted to input credentials (e.g., a login and password), personal identification code, or any other alphanumeric data. During the user makes the input, keystroke dynamics is retrieved from the input. In general, keystroke dynamics, or typing dynamics, is the detailed timing information that describes exactly when each key was pressed and when it was released as the user is typing at the keyboard or touchscreen. Keystroke dynamics may include various information, for example, typing rhythm, time period spent between a first key is pressed and a second key is pressed, time period spent between a first key is depressed and a second key is depressed, time period spent during one or more keys are pressed, force applied by the user against a key, timing pattern, pattern of individual motor skills, or any combination thereof.

After the keystroke dynamics is acquired, a feature vector related to it is calculated by calculating of multiple sub-feature values. The sub-feature values can be calculated using various algorithms such as normalization, relations between keystroke dynamics events, relations of sums of various sub-feature values, and so forth. The feature vector is then selectively compared to a group of reference feature vectors associated to the user. In particular, the reference feature vectors may refer to previously stored feature vectors and be associated with authorized users. In addition, or alternatively, a group of close reference feature vectors can selected for further more precise comparison (this process is also known as "classification"). If it is determined that the newly obtained feature vector is similar to the selected group reference feature vectors, the user is authenticated. Otherwise, the user is not authenticated.

The present teachings further provide unique and effective process for determining similarity between the newly obtained feature vector and selected reference feature vectors. This process involves decomposition of these vectors onto multiple sub-vectors having the same length. Further, a first group of sub-vectors related to the newly obtained feature vector is compared to a second group of sub-vectors related to the reference feature vectors so that a distance vector and/or similarity value(s) is(are) calculated. If the distance vector falls within predetermined thresholds or, in other words, if a number of various sub-vectors of the first and second groups are close to each other, the newly obtained feature vector is considered similar to the one or more reference feature vectors. Otherwise, the newly obtained feature vector is not considered similar and the user is not authenticated.

Another important feature of the authentication methods disclosed herein is dynamic adaptation. Dynamic adaptation involves selection of the least similar reference feature vector (or one of less similar reference feature vectors) of previously selected group of reference feature vectors associated with the user. The selected least similar reference feature vector is then replaced with the newly obtained feature vector if it is more representative or close to the remaining reference feature vectors associated with the user. This process enables to improve the authentication methods and systems every time the user makes an input and is granted with access.

It should be also mentioned that the present teachings may involve acquiring additional biometrics data such as fingerprints, voice data, face images, handprints, iris images, retina images, signature images, brainwave data, various physical-based biometrics, and so forth. The described methods can be also applied to the additional biometrics so that at least one additional feature vector is calculated. Similarly, it can be compared to reference feature vectors and based upon the comparison and authentication results related to the previously mentioned feature vector, the corresponding authentication decision can be made.

Thus, the present teachings involve useful and effective techniques for authenticating users of various electronic devices by acquiring and unique processing of biometrics data. These methods may be promising in protection of data on computers, cellular phones, smart phones, ATMs, and so forth.

In accordance with an aspect, there is provided a computer-implemented method for user authentication. An example method may comprise: receiving an input of a user to be authenticated, acquiring biometric data of the user, generating a feature vector based upon the biometric data, selecting from a database a set of reference feature vectors associated with the user, determining similarity between the feature vector and the set of reference feature vectors, and making an authentication decision based upon the determined similarity between the feature vector and the set of reference feature vectors.

In various embodiments, the input may comprise a login and a password. The biometric data may comprise one or more of the following: a typing rhythm, keystroke dynamics, a time period between two or more keys are pressed, a time period spent during one or more keys are pressed, a force applied by the user against a key, a timing pattern, a pattern of user motor skills, or a combination thereof. The method may further comprise generating one or more sub-feature values, and wherein the feature vector includes the one or more sub-feature values. The sub-feature values may comprise a set of the following values:

$$L_i = \frac{v_i}{\tau}$$

where i is an integer value between 1 and k, $v_i$ is a keystroke dynamics parameter, and $\tau$ is a constant value. $v_i$ may define keystroke dynamics using the following equations:

$$v_1 = t_2 - t_1, v_2 = t_3 - t_2, \ldots, v_{k-1} = t_k - t_{k-1}$$

where $t_1 \ldots t_k$ represents a sequence of time intervals between a key pressed and depressed for one or more keys.

One or more sub-feature values may comprise a set of the following values:

$$r_i = \beta_1 \frac{L_{i+1}}{L_i}$$

where $\beta_1$ is a constant value.

One or more sub-feature values may comprise a set of the following values:

$$s_i = \beta_2 \frac{L_i + L_{i+1}}{L_{i+2}}$$

where $\beta_2$ is a constant value.

One or more sub-feature values may comprise a set of the following values:

$$R = \beta_3 \frac{\sum_{i=1}^{m} L_i}{\sum_{i=m}^{k} L_i}$$

where $\beta_3$ is a constant value, and m is a modulus of i=k/2.

In various embodiments, mentioned determining similarity between the feature vector and the set of reference feature vectors may comprise: breaking the feature vector onto a first set of sub-vectors, breaking the set of reference feature vectors onto a second set of sub-vectors, and comparing the first set of sub-vectors and the second set of sub-vectors.

In various embodiments, the method may further comprise calculating Euclidian distance between the first set of sub-vectors and the second set of sub-vectors, calculating a statistical average delta vector between the first set of sub-vectors and the second set of sub-vectors, calculating Mahalanobis distance, or a combination thereof. The method may further comprise calculating one or more similarity values based upon the result of comparison of the first set of sub-vectors and the second set of sub-vectors. Determining similarity between the feature vector and the set of reference feature vectors may comprise comparing the one or more similarity values with a threshold, wherein the threshold is a predetermined tunable parameter. Determining similarity between the feature vector and the set of reference feature vectors may comprise applying one or more machine learning algorithms, wherein the machine learning algorithms comprising one or more of the following: neural networks based algorithms, Support Vector Machine (SVM) algorithms, and k-nearest neighbor (k-NN) algorithms. In various embodiments, the method may further comprise training the at least one machine learning algorithm each time the input is received and the user is authenticated. The method may also comprise updating the set of reference feature vectors associated with the user each time the input is received and the user is authenticated. The method may further comprise: selecting the least similar reference feature vector among the reference feature vectors associated with the user, and replacing the least similar reference feature vector with the feature vector. In various embodiments, the method may further comprise: acquiring additional biometrics data of the user, the additional biometrics data comprising behavioral biometrics and/or physical biometric data, generating an additional feature vector based upon the additional biometric data, determining similarity between the additional feature vector and the set of reference feature vectors, and making the authentication decision based upon the determined similarity between the additional feature vector and the set of reference feature vectors.

In further examples, the above methods steps are stored on a machine-readable medium comprising instructions, which when implemented by one or more processors perform the steps. In yet further examples, subsystems or devices can be adapted to perform the recited steps. Other features, examples, and embodiments are described below.

BRIEF DESCRIPTION OF THE DRAWINGS

Embodiments are illustrated by way of example, and not limitation, in the figures of the accompanying drawings, in which like references indicate similar elements and in which.

DETAILED DESCRIPTION

Figure 1:
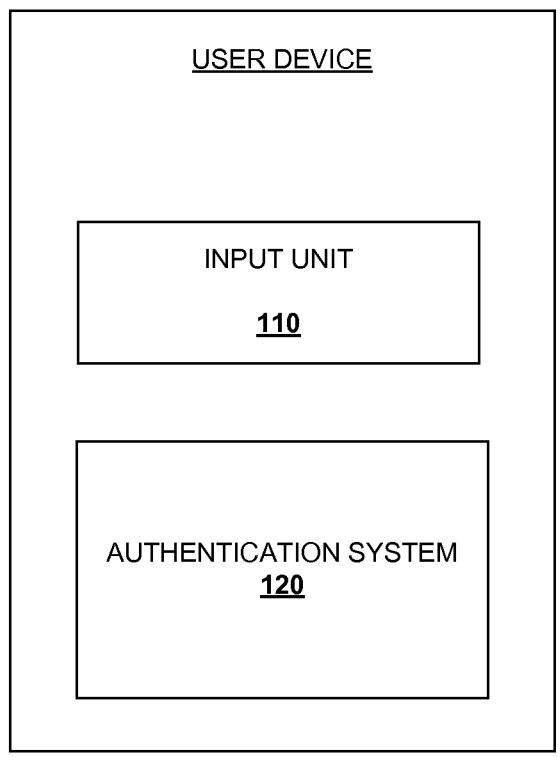
FIG. 1 shows a block diagram illustrating an example user device suitable for implementing methods for user authentication.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made, without departing from the scope of what is claimed. The following detailed description is, therefore, not to be taken in a limiting sense, and the scope is defined by the appended claims and their equivalents.

The techniques of the embodiments disclosed herein may be implemented using a variety of technologies. For example, the methods described herein may be implemented in software executing on a computer system or in hardware utilizing either a combination of microprocessors, or other specially designed application-specific integrated circuits (ASICs), programmable logic devices, or various combinations thereof. In particular, the methods described herein may be implemented by a series of computer-executable instructions residing on a storage medium such as a disk drive or a computer-readable medium.

The embodiments described herein relate to computer-implemented methods for authenticating users of various electronic devices. The electronic devices may refer to computers (e.g., desktop computers, laptop computers, tablet computers), servers (e.g., web-enabled servers, hosts), cellular phones, smart phones, Personal Digital Assistants (PDAs), game consoles, smart television sets (e.g., a television set or set-top box having connectivity to the Internet), ATMs, security systems, alarm systems, intercoms, input systems, or any combination thereof. Without regard to what system is used, there is an input unit which enables the users to make an input. The present teachings involve prompting the user to make an input when the user wants to access certain data, software or device. The input may refer to Personal Identity Number (PIN), credentials such as a login and password, numeric and/or character code, and so forth. Once the user input is acquired, the input is analyzed so that behavioral biometrics data is retrieved. The behavioral biometrics data may include keystroke dynamics, or, in other words, the detailed timing information that describes exactly when each key was pressed by the user and when it was released as the user is typing at the keyboard or touchscreen of any of the abovementioned electronic device. Keystroke dynamics may include various information, for example, typing rhythm, time period spent between a first key is pressed and a second key is pressed, time period spent between a first key is depressed and a second key is depressed, time period spent during one or more keys are pressed/depressed, force applied by the user against a key, timing pattern, pattern of individual motor skills, or any combination thereof.

Further, the keystroke dynamics is processed to generate a feature vector associated with the user to be authenticated. The feature vector is generated by calculating multiple sub-feature values which are then combined together into the single feature vector. The sub-feature values are calculated using various algorithms such as normalization, relations between keystroke dynamics events, relations of sums of various sub-feature values, etc., which will be described below in greater details. The feature vector generated is then compared to a group of reference feature vectors related to the user. These reference feature vectors refer to previously stored feature vectors and associated with the authorized user. If it is determined that the feature vector is similar to one or more of the selected group reference feature vectors, the user is authenticated. In other words, there can be calculated a distance vector which consists of similarity values between the feature vector and the group of reference feature vectors. If the distance vector is within predetermined limits, the user is considered authenticated or identified.

The process of determining similarity between the feature vector and the group of reference feature vectors is unique and involves decomposition of these vectors onto multiple sub-vectors having the same length, and more specifically there are generated a first group of sub-vectors related to the feature vector and a second group of sub-vectors related to various reference feature vectors. The first group of sub-vectors is then compared to the second group of sub-vectors so that a distance vector is generated. If the distance vector falls within predetermined thresholds or, in other words, if a number of various sub-vectors of the first and second groups are close to each other, the feature vector is considered similar to the one or more reference feature vectors. Otherwise, the newly obtained feature vector is not considered similar and the user is not authenticated.

Each time the user is authenticated, the database consisting of reference feature vectors associated with this user can be optionally updated. This process is called "dynamic adaptation". Dynamic adaptation involves selection of the least similar reference feature vector (or one of less similar reference feature vectors) of previously selected group of reference feature vectors associated with the user, and this least similar reference feature vector is then replaced with the newly obtained feature vector. This process enables to improve the authentication methods and systems every time the user makes an input and is granted with access. It is very important feature as the behavioral biometrics may change over the time for a given user. It was shown that the authentication system trained in such a way may enhance reliability of the authentication system, while reducing FAR and FRR values close to 0%.

As mentioned, the present teachings may involve acquiring additional biometrics data such as fingerprints, voice data, face images, handprints, iris images, retina images, signature images, brainwave data, various physical-based biometrics, and so forth. The described methods can be also applied to the additional biometrics so that at least one additional feature vector is calculated. The additional feature vectors can be compared to corresponding reference feature vectors to determine similarity therebetween. The authentication decision can be based upon the comparison results of the primary and additional feature vectors.

Referring now to the drawings, FIG. 1 shows a block diagram illustrating an example user device 100 suitable for implementing methods for user authentication. In particular, the user device 100 comprises an input unit 110 and an authentication system 120.

The user device 100 refers to any electronic computing device having the ability to process data. Examples of the user device 100 include computers (e.g., desktop computers, laptop computers, tablet computers), servers (e.g., web-enabled servers), cellular phones, smart phones, Personal Digital Assistants (PDAs), game consoles, thin clients, smart television sets (e.g., a television set or set-top box having connectivity to the Internet), ATMs, security systems, alarm systems, intercoms, and so forth.

The input unit 110 may include a keyboard, keypad, joystick, touchpad, touchscreen, sensor, video camera, gesture recognition device, scanner, force meter, or any combination thereof. The input unit 110 may be used by users willing to access certain data, software, website, etc. to input any predetermined alphanumerical data so that various behavioral and/or physiological biometrics data can be retrieved from the input.

The authentication system 120 is configured to implement methods for user authentication as described herein. The authentication system 120 may be implemented as computer codes, software, firmware, hardware, or any combination thereof. In the shown embodiment, the authentication system 120 is incorporated into the user device 100. In an example, if the user device 100 is a smart phone or tablet computer, the authentication system 120 may be implemented as a mobile application. In another example, if the user device 100 is a computer, the authentication system 120 may be implemented as hardware components and processor-implementable codes. It should be understood that various embodiments are possible depending on the application.

Furthermore, it should be mentioned that the user device 100 may optionally include additional units to acquire additional biometrics data. For example, user device 100 may include various sensors, video cameras, scanners, pressure sensors, force meters, and so forth. These units may enable to capture fingerprints, face images, retina images, force patterns, weight, and so forth.

Figure 2:
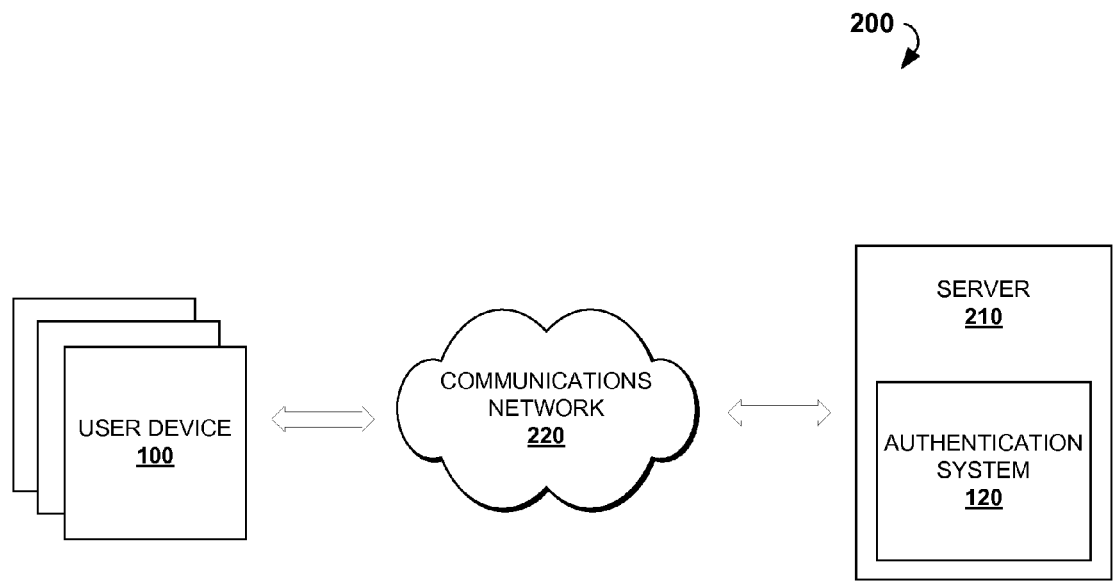
FIG. 2 shows a block diagram illustrating a system environment suitable for implementing methods for user authentication, according to an example embodiment.

FIG. 2 shows a block diagram illustrating a system environment 200 suitable for implementing methods for user authentication, according to an example embodiment. In the example shown, the system environment 200 comprises one or more user devices 100, a server 210 incorporating the authentication system 120, and a communications network 220, which may operatively couple all mentioned devices and systems.

The user device 100 may refer to any electronic computing device having at least a network interface allowing communication with the server 210 over the communications network 220. In particular, the user may wish to access certain data, software, operational system, website, etc. stored in (hosted by) the server 210. To grant access to the server 210, the user of the user device 100 may be prompted to make a certain input via the input unit 110 of the user device 110 such that this input is then transmitted to the authentication system 120 embedded into the server 210 for further analysis as will be described below. The authentication system 120 may then either grant access to the server or deny access for the user based on the analysis of the user's input.

With continuing reference to FIG. 2, the communications network 220 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port, such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The communications network 220 can further include or interface with any one or more of the following: RS-232 serial connection, IEEE-1394 (Firewire) connection, Fiber Channel connection, IrDA (infrared) port, SCSI (Small Computer Systems Interface) connection, USB (Universal Serial Bus) connection, or other wired or wireless, digital or analog interface or connection, mesh or Digi® networking.

Figure 3:
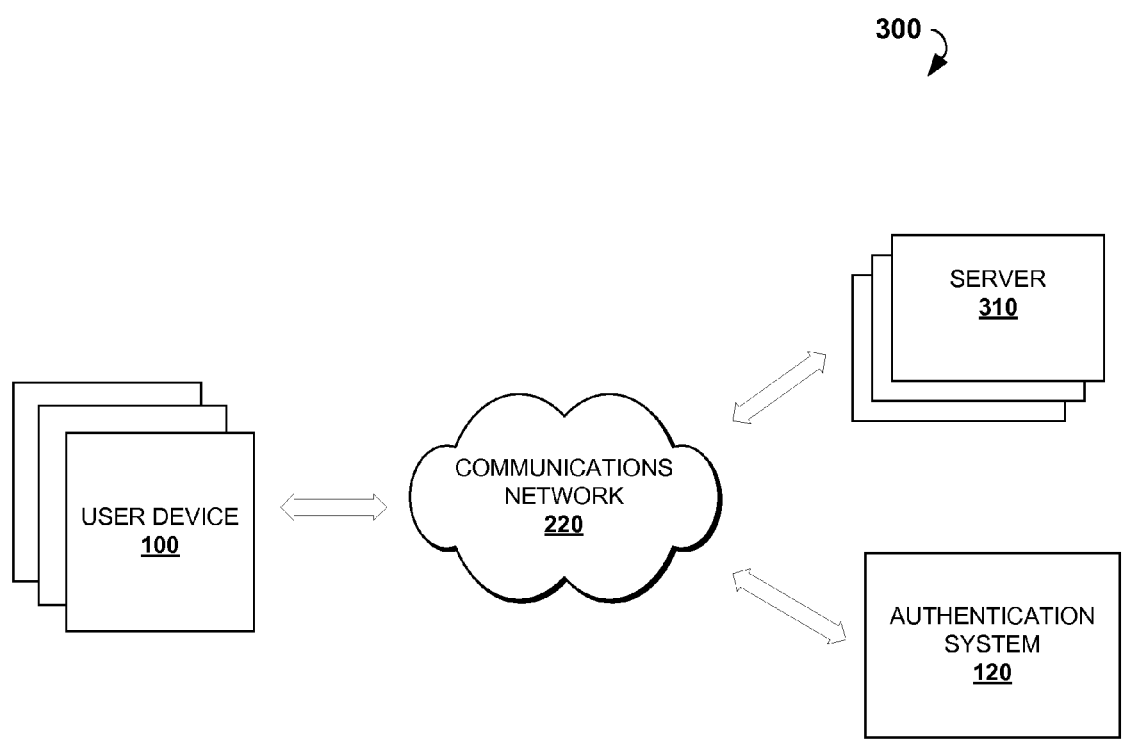
FIG. 3 shows a block diagram illustrating a system environment suitable for implementing methods for user authentication, according to another example embodiment.

FIG. 3 shows a block diagram illustrating another example embodiment of system environment 300 suitable for implementing methods for user authentication. In the example shown, the system environment 300 comprises one or more user devices 100, a server 310, the authentication system 120, and the communications network 220.

The major difference of this embodiment comparing to the above described is that the authentication system 120 is configured as a stand-alone system (e.g., a server), which can be accessed via the communications network 220. In particular, once the user wants to access certain data stored in the server 310 with the help of the user device 100, the user may be prompted to make a certain input which is then transmitted to the authentication system 120 for processing. The authentication decision is then made by the authentication system 120 and transmitted to the server 210. If the user is authenticated by the authentication system 120, the server 210 may grant access to requested data (e.g., a website).

Accordingly, many various websites such as social networking sites, electronic mail sites, blogs, micro-blogs, podcasts, chats, web feeds, content-sharing tools, etc. may use the standalone and remotely located authentication system 120 for authorizing users to content, personal profiles, electronic mail, or any other data stored in the various websites hosted by the one or more servers 310.

Figure 4:
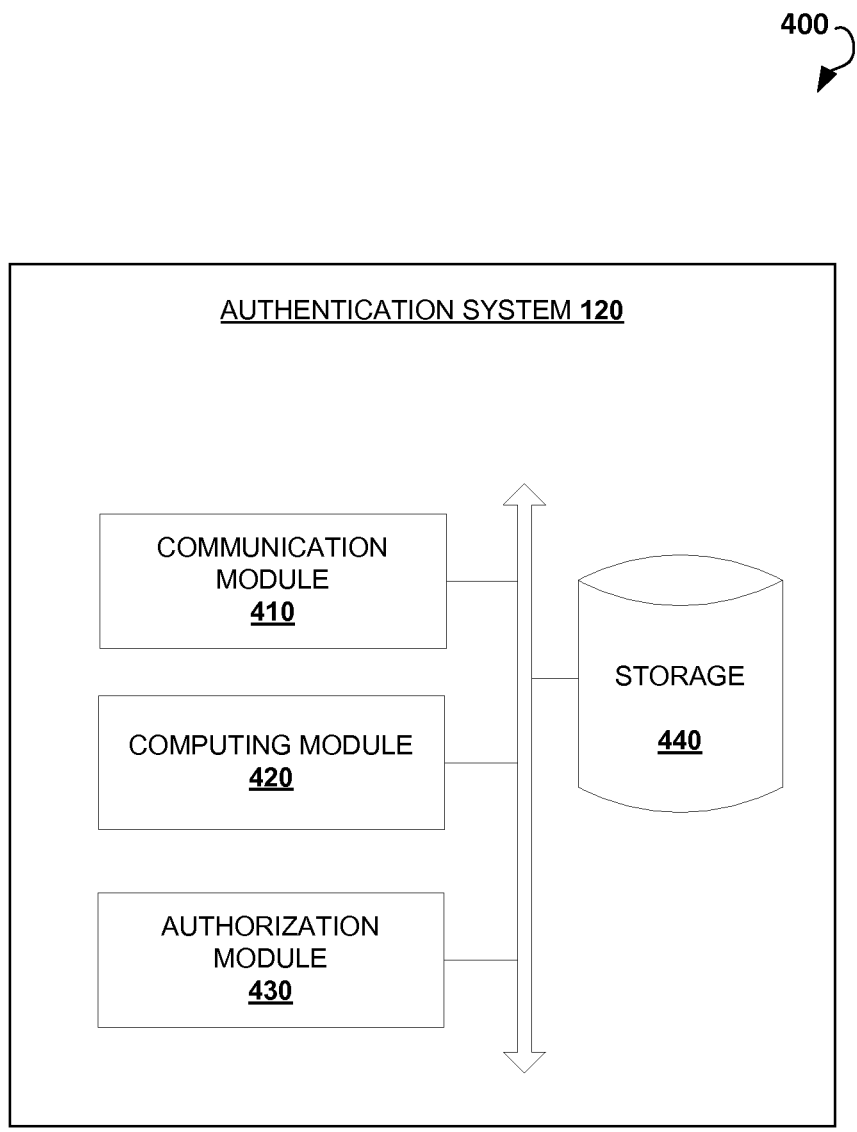
FIG. 4 shows a block diagram of authentication system according to an example embodiment.

FIG. 4 shows a block diagram of the authentication system 120 according to an example embodiment. In this embodiment, the authentication system 120 may include, embed, or be coupled to a communication module 410, a computing module 420, an authorization module 430, and storage 440. It should be mentioned that all of these modules can be integrated within a single apparatus, or, alternatively, can be remotely located and optionally accessed via a third party.

It will be appreciated by one of ordinary skill that examples of the foregoing modules may be virtual, and instructions said to be executed by a module may, in fact, be retrieved and executed by a processor (embedded processor). The authentication system 120 may further include additional modules, but the disclosure of such modules is omitted so as not to burden the entire description of the present teachings.

The communication module 410 can be configured to receive an alphanumeric input of user to be authenticated. The user input can be captured by the input unit 110 and then transmitted to the communication module 410. The communication module 410 can be also configured to acquire biometric data of the user. More specifically, the biometrics data can be retrieved from the user input, and may relate, for example, to keystroke dynamics, typing dynamics, pressure dynamics, etc. The communication module 410 can be also configured to acquire additional biometric data of the user which may relate to physical biometrics (e.g., fingerprints, face outlines, retina images, gestures, etc.)

The computing module 420 can be configured to process user biometrics data and generate a corresponding feature vector. As it will be described below in greater detail, the feature vector may be generated by calculating multiple sub-feature values and then combining them into a single feature vector. The computing module 420 can be also configured to select from a database stored in the storage 440 a set of reference feature vectors associated with the user to be authenticated. The set of reference feature vectors can be selected based upon the user input (for example, based upon the user login). The computing module 420 can be further configured to determine similarity between the feature vector and the set of reference feature vectors. The similarity can be determined by decomposition of the feature vector and the set of reference feature vectors into two groups of sub-vectors of the same length and determining a distance vector therebetween.

The computing module 420 can be configured to process mentioned additional biometrics data. Similarly, the additional biometrics data can be processed and an additional feature vector can be generated and further compared to corresponding reference feature vectors. By the result of comparison, a corresponding additional distance vector can be calculated.

The authorization module 430 can be configured to make an authentication decision based upon the determined similarity between the feature vector (additional feature vector) and the corresponding set of reference feature vectors (i.e., the distance vector or additional distance vector). The authentication decision can be then sent to a requested software, operational system, website, computer, server, etc. to grant access to the particular user.

The storage 440 can be configured to store a database of multiple reference feature vectors associated with multiple users. The reference feature vectors can be obtained during registration process of users. The reference feature vectors may be associated with biometrics captured when users input a particular alphanumeric code multiple times. For example, the user may input ten times a password, the corresponding keystroke dynamics can be acquired from these inputs and reference feature vectors can be calculated for these initial inputs. Further, when the same user makes an input to be authenticated, the newly obtained input is compared to the previously stored ones. The storage 440 can also store additional biometrics data.

Figure 5:
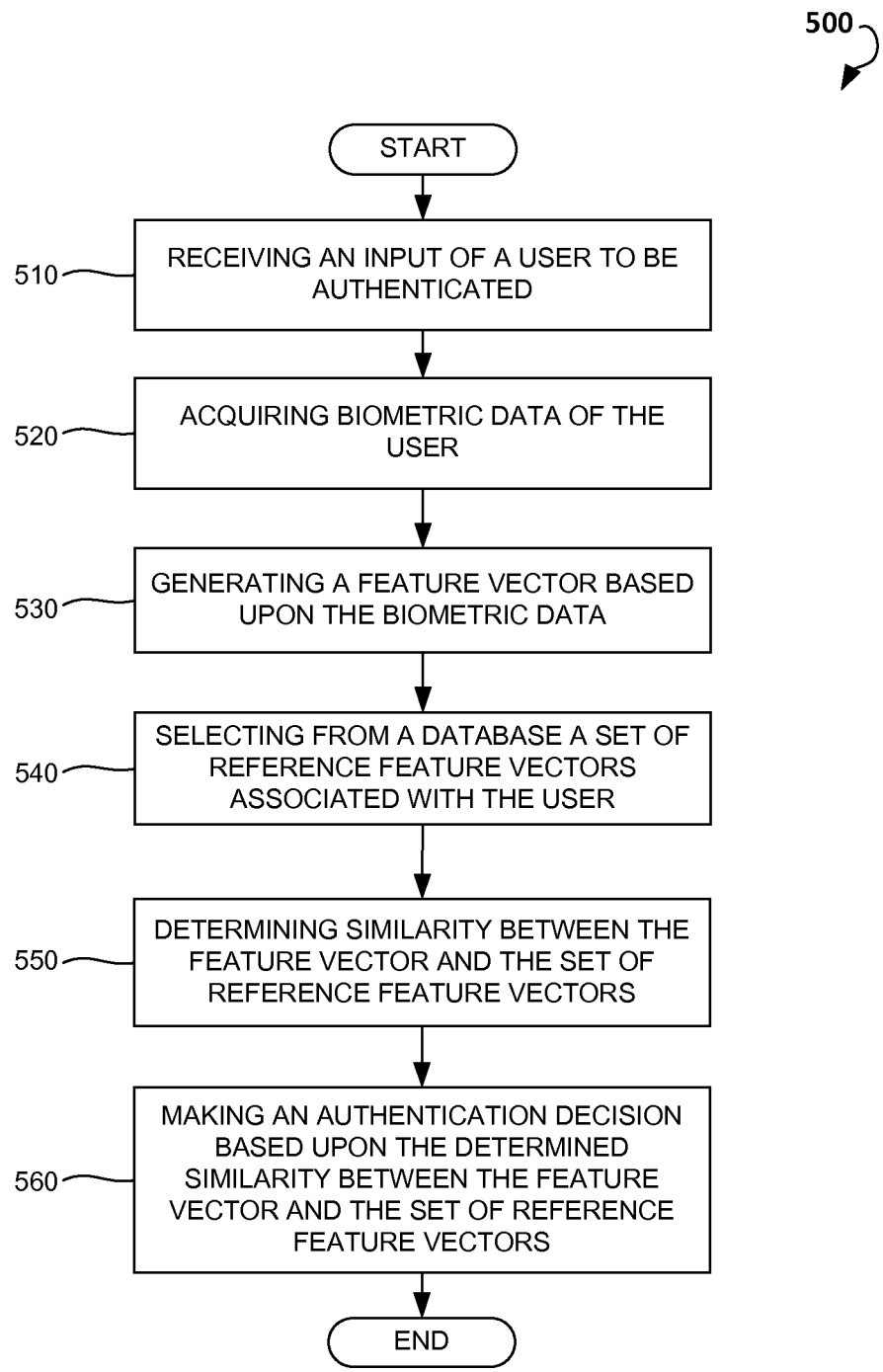
FIG. 5 is a process flow diagram showing a method for user authentication, according to an example embodiment.

FIG. 5 is a process flow diagram showing a method 500 for user authentication, according to an example embodiment. The method 500 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the authentication system 120.

The method 500 may commence at operation 510 with the communication module 410 receiving an input of a user to be authenticated. The input can be made via the input unit 110 of the user device 100 and be referred to alphanumeric input such as login and password, PIN code, answer to a security question, and so forth.

At operation 520, the communication module 410 acquires biometric data of the user. More specifically, the biometric data may refer to keystroke dynamics or typing dynamics, and include timing information that describes exactly when each key was pressed and when it was released as the user is making the input. Accordingly, keystroke dynamics may include one or more of the following: typing rhythm, time period spent between a first key is pressed and a second key is pressed, time period spent between a first key is depressed and a second key is depressed, time period spent during one or more keys are pressed, force applied by the user against a key, timing pattern, pattern of individual motor skills, and so forth.

At operation 530, the computing module 420 generates a feature vector based upon the biometric data and associated with the user to be authenticated. For this purpose, the computing module 420 calculates multiple sub-feature values (or vectors) and then combines them together into the single feature vector. Below are provided mere examples of sub-feature values.

Assume keystroke dynamics acquired from the user input include a sequence of key press/release times, which can be defined by $t_1 \ldots t_k$, where k is a positive integer number. Accordingly, key press/release time intervals can be defined as follows:

$$\begin{cases} v_1 = t_2 - t_1 \\ v_2 = t_3 - t_2 \\ \ldots \\ v_{k-1} = t_k - t_{k-1} \end{cases} \qquad \text{Eq. 1}$$

In other words, $v_i$ defines keystroke dynamics of the user to be authenticated.

A first set of sub-feature values can be calculated applying a normalization function to the set of $v_i$ values. In particular, the following equation can be used:

$$L_i = \frac{v_i}{\tau} \qquad \text{Eq. 2}$$

where i is a positive integer value between 1 and k and $\tau$ is a constant value (e.g., a real number) which can be one of the tunable parameters.

A second set of sub-feature values can be calculated by applying the following relational equation:

$$r_i = \beta_1 \frac{L_{i+1}}{L_i} \qquad \text{Eq. 3}$$

where $\beta_1$ is a constant value (e.g., a real number). $\beta_1$ can be one of the tunable parameters.

A third set of sub-feature values can be generated by calculating relation of sums related to first set and second set of sub-feature values:

$$s_i = \beta_2 \frac{L_i + L_{i+1}}{L_{i+2}} \quad \text{Eq. 4}$$

where $\beta_2$ is a constant value. $\beta_2$ can be one of the tunable parameters.

A forth set of sub-feature values can be generated by calculating relation of sum related to normalized key press/release time intervals from the first half of values to another half of values:

$$R = \beta_3 \frac{\sum_{i=1}^{m} L_i}{\sum_{i=m}^{k} L_i} \quad \text{Eq. 5}$$

where $\beta_3$ is a constant value, and m is a modulus of i=k/2. $\beta_3$ can be one of the tunable parameters.

The feature vector can be represented, for example, as a combination of first set, second set, third set, and fourth set of sub-feature values. Accordingly, the feature vector can be defined as follows:

$$F = (L_1, \ldots, L_N, r_1, \ldots, r_{N-1}, s_1, \ldots, s_{N-2}, R) \quad \text{Eq. 6}$$

where N=k−1 (in other words, N is the number of values $v_i$).

At operation 540, the computing module 420 selects from a database stored in the storage 440 a set of reference feature vectors associated with the user. This process is also known as "categorization" and it may involve selecting those previously stored reference feature vectors that are associated with the input (e.g., a login) made be the user. In other embodiments, the set of reference feature vectors can be selected based on comparison of the feature vector to all reference feature vectors and a group of the closest ones can be selected for further more detailed analysis. It should be understood that reference feature vectors are associated with the user and their relate to "etalon" vectors.

At operation 550, the computing module 420 determines similarity between the feature vector and the set of selected reference feature vectors. The similarity is determined by applying "wave classification" technique which involves decomposition of the feature vector onto a first group of sub-vectors and decomposition of the set of selected reference feature vectors onto a second group of sub-vectors. The first and second groups of sub-vectors can be of the same length, and by the results of their comparison one or more similarity values can be calculated.

More specifically, the process of comparing sub-vectors is as follows. First off, a "fuzzy" function can be applied to Euclidian distance values calculated with the help of Equation 1. The fuzzy function may also depend on the tunable parameters T and W, and in an example embodiment, may be defined as follows:

$$f(x, T, W) = \begin{bmatrix} 0, & \text{when } x \leq T - W \\ \frac{x-T}{W} \cdot \beta_4, & \text{when } T < x \leq T + W \\ 1, & \text{when } x > T + W \end{bmatrix} \quad \text{Eq. 7}$$

where $\beta_4$ is a constant value (e.g., a real number). A can be one of the tunable parameters. X represents a component defined by Euclidian distance vector.

Further, assume, p(i) is an sub-vector of the first group, while q(i) is an sub-vector of the second group, and the aim is to compare p(i) and q(i). Note, p(i) and q(i) sub-vectors are of the same length N. Comparison of these sub-vectors may include calculation of Euclidian distance therebetween, a statistical average delta vector, Mahalanobis distance, and so forth. For example, Euclidian distance between the sub-vectors p(i) and q(i) can be defined by the following equation:

$$d(p, q) = \sum_{i=1}^{N-M} f\left(\sqrt{\frac{1}{M} \sum_{j=1}^{M} (p_{i+j} - q_{i+j})^2}, T, W\right) \quad \text{Eq. 8}$$

where T and W are constant values (e.g., real numbers), which can be also tunable parameters.

Accordingly, there is generated a result vector defining f values falling within 0 and 1. The result vector is then can be compared to predetermined threshold (e.g., a vector), and if the result vector is greater than the threshold, the first group of sub-vectors is considered similar to the second group of sub-vectors. In this case, the feature vector is also considered similar to one or more reference feature vectors. In various embodiments, the similarity value(s) can also be calculated.

At operation 560, the authorization module 430 makes an authentication decision based upon the determined similarity between the feature vector and the set of reference feature vectors. In particular, if it is determined at operation 550 that the feature vector is similar to one or more of the set of reference feature vectors, the authorization module 430 makes a positive authentication decision so that the user can be then granted with access to desired data, software, website, and so forth. If it is determined that the feature vector is not similar to one or more of the set of reference feature vectors (or the similarity value(s) is(are) below a predetermined threshold), a negative authentication decision is made so that the user is denied to access desired data, software, website, etc.

It should be mentioned that one or more of operations 510-560 may be performed with the help of one or more machine learning algorithms such neural networks based algorithms, Support Vector Machine (SVM) algorithms, and k-nearest neighbor (k-NN) algorithms, and the like. In further embodiments, the machine learning algorithms can be trained each time the input is received and the user is authenticated. More specifically, this process can involve updating the set of reference feature vectors associated with the user each time the input is received and the user is authenticated. For example, if a user was successfully authenticated, the least similar reference feature vector among all reference feature vectors associated with the user is selected and replaced with the newly obtained feature vector.

Moreover, each time the user is successfully authenticated, the tunable parameters T and/or W can be also updated. For example, a number of consequent successes S can be calculated, and if S exceeds a predetermined parameter P, which may correspond to requested security level, the tunable parameter T can be slightly increased. Otherwise, in case of rejection, the tunable parameter T can be slightly decreased.

Accordingly, such dynamic adaptation process enables to train the authentication system 120 so that there FAR and FRR values become lower over the time for a given user. This is very important feature of the authentication system 120 as user behavior and typing pattern may slowly change over the time in light of development of typing skills, password complexity, psychological factors, and so forth. Users may also have several typing rhythms. However, it should be understood that the dynamic adaptation process is an optional process and may not be performed in either all attempts to access data, or in certain cases.

In addition, the method 500 for user authentication may comprise several other optional operations. In particular, there additional biometrics data of the user to be authenticated can be acquired. The additional biometrics data may comprise various behavioral biometrics and/or physical biometric data (e.g., face outline, retina image, fingerprints, etc.). Similarly to what was described above, an additional feature vector can be generated based upon the additional biometric data, and similarity between the additional feature vector and the set of reference feature vectors associated with the user can be then determined. The authentication decision can be further made based upon the determined similarity between the feature vector and the set of reference feature vectors and also based upon similarity between the additional feature vector and the set of reference feature vectors.

Figure 6:
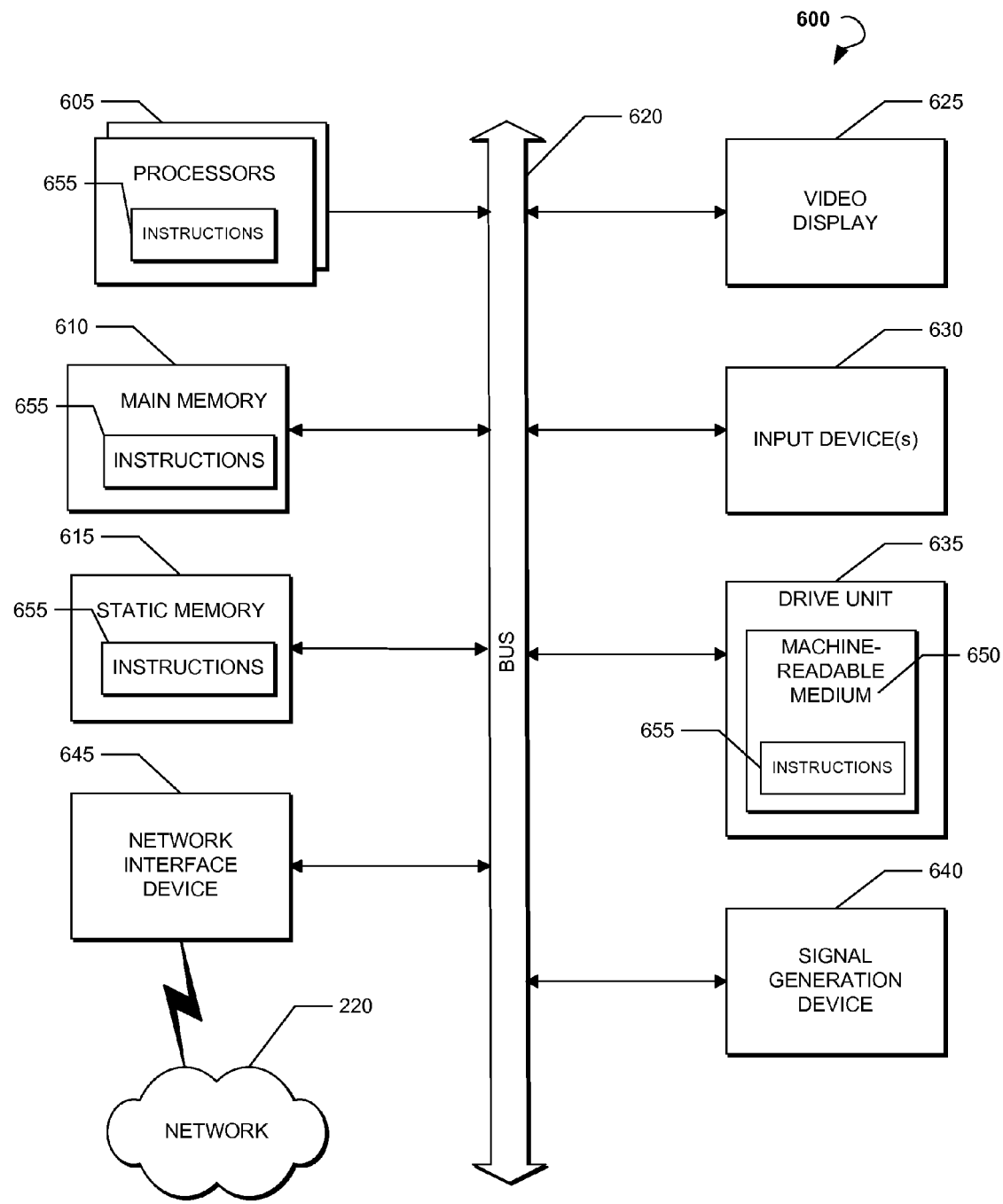
FIG. 6 is a diagrammatic representation of an example machine in the form of a computer system within which a set of instructions, for the machine to perform any one or more of the methodologies discussed herein, is executed.

FIG. 6 shows a diagrammatic representation of a computing device for a machine in the example electronic form of a computer system 600, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server, or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as a Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 605 (e.g., a central processing unit (CPU), a graphics processing unit (GPU), or both), and a main memory 610 and a static memory 615, which communicate with each other via a bus 620. The computer system 600 can further include a video display unit 625 (e.g., a LCD or a cathode ray tube (CRT)). The computer system 600 also includes at least one input device 630, such as an alphanumeric input device (e.g., a keyboard), a cursor control device (e.g., a mouse), a microphone, a digital camera, a video camera, and so forth. The computer system 600 also includes a disk drive unit 635, a signal generation device 640 (e.g., a speaker), and a network interface device 645.

The disk drive unit 635 includes a computer-readable medium 650, which stores one or more sets of instructions and data structures (e.g., instructions 655) embodying or utilized by any one or more of the methodologies or functions described herein. The instructions 655 can also reside, completely or at least partially, within the main memory 610 and/or within the processors 605 during execution thereof by the computer system 600. The main memory 610 and the processors 605 also constitute machine-readable media.

The instructions 655 can further be transmitted or received over the communications network 220 via the network interface device 645 utilizing any one of a number of well-known transfer protocols (e.g., Hyper Text Transfer Protocol (HTTP), CAN, Serial, and Modbus).

While the computer-readable medium 650 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, computer-implemented methods and systems for authenticating of users based upon processing of biometrics data. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for user authentication, the method comprising:
receiving an input of a user to be authenticated;
acquiring biometric data of the user;

generating a plurality of sub-feature values based upon the biometric data, wherein each of the sub-feature values is calculated as $$L_i = \frac{v_i}{\tau}$$

where i is an integer value between 1 and k, $v_i$ is a biometric parameter, and $\tau$ is a constant value;

generating a feature vector, wherein the feature vector includes the plurality of sub-feature values;

selecting from a database a set of reference feature vectors associated with the user;

determining similarity between the feature vector and the set of reference feature vectors; and making an authentication decision based upon the determined similarity between the feature vector and the set of reference feature vectors.

2. The method of claim 1, wherein the input comprising a login and/or a password.

3. The method of claim 1, wherein the biometric data comprising one or more of the following: a typing rhythm, keystroke dynamics, a time period between two or more keys are pressed, a time period spent during one or more keys are pressed, a force applied by the user against a key, a timing pattern, a pattern of user motor skills, or a combination thereof.

4. The method of claim 1, wherein $v_i$ define keystroke dynamics using the following equations:

$$v_1 = t_2 - t_1, v_2 = t_3 - t_2, \ldots, v_{k-1} = t_k - t_{k-1}$$

where $t_1 \ldots t_k$ represents a sequence of time intervals between a key pressed and depressed for one or more keys.

5. The method of claim 1, wherein the one or more sub-feature values are calculated as follows:

$$r_i = \beta_1 \frac{L_{i+1}}{L_i}$$

where $\beta_1$ is a constant value.

6. The method of claim 1, wherein the one or more sub-feature values are calculated as follows:

$$s_i = \beta_2 \frac{L_i + L_{i+1}}{L_{i+2}}$$

where $\beta_2$ is a constant value.

7. The method of claim 1, wherein the one or more sub-feature values are calculated as follows:

$$R = \beta_3 \frac{\sum_{i=1}^{m} L_i}{\sum_{i=m}^{k} L_i}$$

where $\beta_3$ is a constant value, and m is a modulus of i=k/2.

8. The method of claim 1, wherein determining similarity between the feature vector and the set of reference feature vectors comprising:

breaking the feature vector onto a first set of sub-vectors;
breaking the set of reference feature vectors onto a second set of sub-vectors; and
comparing the first set of sub-vectors and the second set of sub-vectors.

9. The method of claim 8, further comprising:
calculating Euclidian distance between the first set of sub-vectors and the second set of sub-vectors, calculating a statistical average delta vector between the first set of sub-vectors and the second set of sub-vectors, calculating Mahalanobis distance, or a combination thereof.

10. The method of claim 8, further comprising:
calculating one or more similarity values based upon the result of comparison of the first set of sub-vectors and the second set of sub-vectors.

11. The method of claim 10, wherein determining similarity between the feature vector and the set of reference feature vectors comprising comparing the one or more similarity values with a threshold, wherein the threshold is a predetermined tunable parameter.

12. The method of claim 1, wherein determining similarity between the feature vector and the set of reference feature vectors comprising applying one or more machine learning algorithms, wherein the machine learning algorithms comprising one or more of the following: neural networks based algorithms, Support Vector Machine (SVM) algorithms, and k-nearest neighbor (k-NN) algorithms.

13. The method of claim 12, further comprising:
training the at least one machine learning algorithm each time the input is received and the user is authenticated.

14. The method of claim 1, further comprising:
updating the set of reference feature vectors associated with the user each time the input is received and the user is authenticated.

15. The method of claim 14, further comprising:
selecting the least similar reference feature vector among the reference feature vectors associated with the user; and
replacing the least similar reference feature vector with the feature vector.

16. The method of claim 1, further comprising:
acquiring additional biometrics data of the user, the additional biometrics data comprising behavioral biometrics and/or physical biometric data;
generating an additional feature vector based upon the additional biometric data;
determining similarity between the additional feature vector and the set of reference feature vectors; and
making the authentication decision based upon the determined similarity between the additional feature vector and the set of reference feature vectors.

17. A system for user authentication, the system comprising:
at least one processor and a memory storing processor-executable codes, which processor-executable codes, when executed by the at least one processor, cause to implement a method, comprising:
receiving an input of a user to be authenticated and acquiring biometric data of the user;
generating a plurality of sub-feature values based upon the biometric data, wherein each of the sub-feature values is calculated as $$L_i = \frac{v_i}{\tau}$$

where i is an integer value between 1 and k, $v_i$ is a biometric parameter, and τ is a constant value;

generating a feature vector, wherein the feature vector includes the plurality of sub-feature values;

selecting from a database a set of reference feature vectors associated with the user; and determining similarity between the feature vector and the set of reference feature vectors; and making an authentication decision based upon the determined similarity between the feature vector and the set of reference feature vectors.

18. A non-transitory processor-readable medium having instructions stored thereon, which when executed by one or more processors, cause the one or more processors to:

receive an input of a user to be authenticated;

acquire biometric data of the user;

generate a plurality of sub-feature values based upon the biometric data, wherein each of the sub-feature values is calculated as $$L_i = \frac{v_i}{\tau}$$

where i is an integer value between 1 and k, $v_i$ is a biometric parameter, and τ is a constant value;

generate a feature vector, wherein the feature vector includes the plurality of sub-feature values;

select from a database a set of reference feature vectors associated with the user;

determine similarity between the feature vector and the set of reference feature vectors; and make an authentication decision based upon the determined similarity between the feature vector and the set of reference feature vectors.

\* \* \* \* \*